(12) United States Patent
Evans

(10) Patent No.: US 8,919,534 B1
(45) Date of Patent: Dec. 30, 2014

(54) DEEP BASEMENT EXCAVATION SYSTEM AND TRUCK LOADER

(71) Applicant: Wayne Edward Evans, Anacortes, WA (US)

(72) Inventor: Wayne Edward Evans, Anacortes, WA (US)

( * ) Notice: Subject to any disclaimer, the term of this patent is extended or adjusted under 35 U.S.C. 154(b) by 0 days.

(21) Appl. No.: 13/987,216

(22) Filed: Jul. 10, 2013

(51) Int. Cl.
*B65G 45/02* (2006.01)
*B65G 37/00* (2006.01)
*B65G 33/14* (2006.01)

(52) U.S. Cl.
CPC ............... *B65G 37/00* (2013.01); *B65G 33/14* (2013.01)
USPC .......................................... 198/500; 198/672

(58) Field of Classification Search
USPC .................................. 198/506–522, 657–677
See application file for complete search history.

(56) References Cited

U.S. PATENT DOCUMENTS

| | | | | |
|---|---|---|---|---|
| 1,867,245 A * | 7/1932 | Bailey | ............................ | 198/608 |
| 1,906,395 A * | 5/1933 | Meeks | ........................... | 198/608 |
| 2,151,253 A * | 3/1939 | Whitney | ......................... | 198/676 |
| 2,360,776 A * | 10/1944 | Kozak et al. | ................... | 198/666 |
| 3,135,377 A * | 6/1964 | Hunter | ........................... | 198/562 |
| 3,187,882 A * | 6/1965 | Smith | ............................ | 198/661 |
| 3,894,400 A * | 7/1975 | Stillwell et al. | .................. | 175/88 |
| 4,226,477 A * | 10/1980 | Capoccia | ......................... | 299/56 |
| 4,443,149 A * | 4/1984 | Isaacson | ........................ | 414/326 |
| 5,139,312 A * | 8/1992 | Jackson | ........................... | 299/13 |
| 6,283,275 B1 * | 9/2001 | Morris et al. | ................. | 198/677 |
| 6,296,435 B1 * | 10/2001 | Wood et al. | ................... | 414/523 |
| 7,234,909 B2 * | 6/2007 | Jonkka | ........................... | 414/302 |
| 8,448,779 B2 * | 5/2013 | Brock | ............................ | 198/677 |

* cited by examiner

*Primary Examiner* — William R Harp
(74) *Attorney, Agent, or Firm* — Risto A. Rinne, Jr.

(57) ABSTRACT

An apparatus for the excavation of a deep basement includes at least two main auger assemblies that are disposed vertically with one assembly atop the other. Auger blades in each assembly are operatively connected together. A feed hopper attached to a bottom of the lower main auger assembly conveys excavation material through a feed hopper opening to the auger blade for lifting. A steel ball is attached to a bottom of the auger blades. The ball rests in a spherical recess and acts as a thrust bearing. A discharge opening is provided proximate a top of the uppermost main auger assembly. A pivoting discharge chute is located at the discharge opening. During use, excavation material is loaded into the feed hopper, conveyed to the auger blades, lifted by the auger blades, discharged through the discharge opening, down the discharge chute and into a dump truck bed for removal.

17 Claims, 3 Drawing Sheets

DEEP BASEMENT EXCAVATION SYSTEM AND TRUCK LOADER

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to excavation and, more particularly, to excavating deep basements.

As real estate becomes increasingly valuable, there arises a growing need to maximize usable space. This is especially true in large cities and other urban areas where available building sites are few and lot sizes tend to be smaller in size.

To maximize space, there are only two directions to go on any given construction site and they are either up or down. Construction in an upward direction is well known, as skyscrapers have been in existence for well over a century.

While there is often a desire to build upward as much as possible, there are practical limits as to how high a building can be constructed. City ordinances may limit height. Additionally, there may be soil, foundation, geological and topography considerations as well as other location-specific concerns. Also, as the height of a building progressively increases the cost begins to rise disproportionately with increasing height.

Construction in a downward direction is also well known. Basements predate even the first skyscraper. A basement is a story below the main or ground floor. A basement (sometimes also referred to as a "cellar") is one or more floors of a building that are either completely or partially below the ground floor. While basements have also been long known there are practical limits how far down they can be built.

Basement space can be utilized in any number of ways. Common uses include additional habitable space that may be used for office, living or even commercial space. Another common use of basement areas is to provide storage space and a location for building utilities. Basements have also long been used to provide a parking area for automobiles.

The maximum practical depth for a basement is limited, in part, by the difficulty and cost of excavation. For some time, the deepest basements tended to be thirty feet deep or less. This depth can be excavated using prior art machines working at grade, such as cranes or other large machines designed for excavation.

However, even deeper basements are now sometimes desired, especially in cities. For example, in cities like San Francisco, Calif., sixty to eighty foot deep excavations (also referred to as "digs" in the industry) are, at times, required.

However, there are numerous serious deficits that arise when prior art excavation techniques are used to excavate this deep (i.e., greater than 30 feet down to approximately an 80 foot depth).

The first is simply a lack of available real estate at or beside the "dig" area (i.e., construction site) that can be used for placement of the necessary excavation equipment. Space on adjoining streets is not generally available as any obstruction would impede the flow of traffic.

As used herein, the phrase, "deep basement" is intended to include any basement that requires excavation deeper than thirty feet below grade level. While basements deeper than thirty feet are the primary focus of this invention, its use may also include the excavation of shallower basements.

When a deep basement is required, prior-art solutions involve the placement of a heavy crane beside the excavation site. Basically, excavation to a depth of approximately thirty feet is made using construction equipment that can dig that deep from grade level. When thirty feet is reached the construction equipment is removed and a crane is brought to the site. However, this is a significant undertaking. Use of a crane requires shoring up (i.e. reinforcing) the site just to support the weight and presence of the crane. This must be done before the crane can be positioned adjacent to the excavation.

As the depth of the excavation proceeds, shotcrete or wood lagging is then used to shore the sidewall of the excavation site. Typically, a plurality of spaced-apart holes are bored to a greater depth than required for the excavation, typically eight to ten feet deeper than the maximum excavation depth. A plurality of vertical steel beams are placed in the holes and are set in poured concrete, which is then allowed to cure. As excavation progresses, shotcrete may be applied to the sides and allowed to cure. Angled tie backs using rod or cable and poured concrete are used to provide additional shoring for the sidewall.

The poured concrete is allowed to cure for approximately one week and then the tie backs are tensioned. Excavation is allowed to proceed for another eight to ten feet of depth. Then, the shoring process must, again, be repeated. This is necessary to prevent caving-in of the ground that is supporting the weight of the crane.

This process renders the crane inoperative for approximately six weeks in total for a sixty foot excavation. Having a large, valuable crane sit idle for six weeks is costly and adds significantly to the cost of excavation.

Also, the crane is simply in the way. During excavation, the soil must be removed from the job site as it is excavated. The use of dump trucks is required to haul the excavated materials away. Therefore, the dump trucks need to access the job site as close as possible. The large crane located on the side of the excavation presents a formidable impediment to access by the dump trucks. It is easy to calculate that an enormous volume of material must be hauled away during deep basement excavation.

Also, the crane presents a hazard to anyone in the vicinity. Therefore, no one works under a crane, anyway. Accordingly, presence of the crane precludes simultaneously accomplishing any other job-related work.

Easy access for dump trucks allows for more rapid filling of the dump trucks in succession as well as their passage to job site for filling and away from the job site after filling. Creating or maintaining good access for dump trucks hastens the process.

Additional complications are caused by the nature of the soil being excavated. For example, the deeper soils encountered during excavation in the San Francisco area are often referred to as "Bay mud". Bay mud is sticky and, as a result, the buckets used to lift it become coated and as little as one-quarter of the material in the bucket actually falls out. This, effectively, decreases the size of the bucket by seventy-five percent. Consequently, the length of time required for excavation can increase dramatically, which in turn increases the time the crane is used and further drives up excavation costs.

Accordingly, there is a need to significantly decrease both the time and cost of deep basement excavation. Ideally, the use of the crane would also be eliminated. Furthermore, it is desirable that the equipment used in deep basement excavation will not impede access by dump trucks and, ideally, would actually improve their loading. Ideally, lighter weight equipment could be lowered into the excavation and used with improved equipment to accomplish excavation of deep basements in a shorter period of time and at significantly lower cost.

A shoring contractor drills holes, including the holes in which vertical steel beams are placed. An excavation contractor presently is hired to handle the excavation. It is also desirable to eliminate the need for one of the contractors by having the remaining contractor perform both the shoring (hole drilling) and the excavation.

There is also another need to more precisely control the release of material into a dump truck. More precise control would prevent over or under-filling or the release of material when a dump truck is not properly positioned to receive the material.

There is also a need to fill the dump truck faster. At present it takes about fifteen to twenty minutes to fill a twelve cubic yard dump truck at an excavation site. If a truck could be filled in as little as four minutes, then multiple dump trucks could be filled in the time it now takes to fill only one dump truck. This would provide a considerable increase in the speed of material removal and, thereby, would lessen the time required for excavation of a deep basement.

Also, it presently costs almost two dollars per minute to operate a dump truck. When considering that many thousands of loads are required during a deep basement excavation, saving as little as a few minutes with each dump truck filling translates to a significant amount of money being saved.

Another existing problem relates to the difficulty and high cost of moving heavy equipment, such as a crane, to and from the job site.

Accordingly, it is desirable to provide machinery for deep basement excavation that can be dismantled and transported in smaller sections to and from the job site. It is also desirable to utilize smaller machinery that can be expanded as the depth of a dig progresses.

There are other problems associated with the prior art use of cranes. They run on large diesel engines and create considerable noise and pollution from their emissions. There is a desire to utilize electric means, such as electric motor(s) wherever possible during a deep basement excavation to lessen noise and decrease pollution by reducing the "carbon footprint" associated with the excavation process.

Before construction at a job site of the actual building can occur, an electrical service must first be installed. Therefore, it is inevitable that an electric service will be installed. If electric motors were used for the excavation, the only impact would be that installation of the electric service would occur sooner. However, this early installation would provide an unexpected benefit in that virtually all of the available electrical power could be used to operate the excavation electric motors as there would be no other significant user of electricity while the excavation is ongoing.

It is also desirable to eliminate the crane and to replace the crane with other machinery that does not create a significant hazard for those working on or below ground level at the job site. This would permit other job-related construction activities to occur concurrently with deep basement excavation activity. This is something that cannot occur with present (i.e., prior art) deep basement construction techniques that require the use of a crane for dig depths in excess of about thirty feet.

Accordingly, there exists today a need for a deep basement excavation system and truck loader that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such a system and method of excavation would be useful and desirable.

2. Description of Prior Art

Cranes and construction equipment are, in general, known. While the structural arrangements of the currently known devices may, at first appearance, have similarities with the present invention, they differ in material respects. These differences, which will be described in more detail hereinafter, are essential for the effective use of the invention and which admit of the advantages that are not available with the prior devices and methods.

OBJECTS AND SUMMARY OF THE INVENTION

It is an object of the present invention to provide a deep basement excavation system and truck loader that improves excavation of basements that are deeper than thirty feet below grade level.

It is also an important object of the invention to provide a deep basement excavation system and truck loader that eliminates the need for a crane to excavate material out of a deep basement excavation.

Another object of the invention is to provide a deep basement excavation system and truck loader that eliminates the need for costly shoring necessary for use with a heavy crane.

Still another object of the invention is to provide a deep basement excavation system and truck loader that eliminates the downtime of a heavy crane that occurs with each successive shoring at each successive increase in depth of approximately eight to ten feet.

Still yet another object of the invention is to provide a deep basement excavation system and truck loader that eliminates the wasted space occupied by a heavy crane used for deep basement excavation.

Yet another important object of the invention is to provide a deep basement excavation system and truck loader that decreases the time required to fill a dump truck with excavation material.

Still yet another important object of the invention is to provide a deep basement excavation system and truck loader that provides improved access to a deep basement excavation site for dump trucks.

A first continuing object of the invention is to provide a deep basement excavation system and truck loader that provides for less noise during deep basement excavation.

A second continuing object of the invention is to provide a deep basement excavation system and truck loader that decreases the cost of deep basement excavation.

A third continuing object of the invention is to provide a deep basement excavation system and truck loader that eliminates the high cost of moving heavy equipment to and from a deep basement excavation site.

A fourth continuing object of the invention is to provide a deep basement excavation system and truck loader that allows for easy transport of the system components to and from a job site.

A fifth continuing object of the invention is to provide a deep basement excavation system and truck loader that includes a plurality of component parts that are easily assembled in-situ.

A sixth continuing object of the invention is to provide a deep basement excavation system and truck loader that uses an electric motor driven power head.

A seventh continuing object of the invention is to provide a deep basement excavation system and truck loader that reduces greenhouse gas emissions that occur during a deep basement excavation.

An eighth continuing object of the invention is to provide a deep basement excavation system and truck loader that is able to remove a wide range of excavation materials.

A ninth continuing object of the invention is to provide a deep basement excavation system and truck loader that is useful in removing Bay mud.

A tenth continuing object of the invention is to provide a deep basement excavation system and truck loader that can eliminate the need for one particular type of contractor.

An eleventh continuing object of the invention is to provide a deep basement excavation system and truck loader that can expand the duties of a shoring contractor to operate the deep basement excavation system and truck loader.

Briefly, a deep basement excavation system and truck loader that is constructed in accordance with the principles of the present invention has a plurality of main auger sections. Each main auger section includes a male square-drive at a lower end and a female square drive at an opposite upper end. The sections are preferably about twenty feet in length, although any length section is possible. Flexibility in the diameter of the augers is also possible. A preferred auger diameter is thirty inches disposed in a thirty-two inch casing. One or more large steel plates are placed on a surface of the excavation and are used to distribute the weight of the system during use. A large steel ball is attached to the male square drive a bottom of the lowermost main auger section. A female support member that includes a hemispherical recess is placed atop the steel plates. The steel ball is disposed in the hemispherical recess. A cone-shaped shield prevents dirt, debris or excavation material from entering into the hemispherical recess. A grease channel is provided and is used to supply grease for lubrication of the steel ball in the hemispherical recess, as desired. The auger sections include hinged access doors through the casing proximate each end. The hinged access doors allow access for fastening the sections together. For deep basement excavation, that is over thirty feet in depth, a minimum of two auger sections are required. The auger sections are secured to a reinforced sidewall. An electric motor powered hydraulic motor is preferably used as a main power head to drive the main auger sections. A feed hopper is disposed at a bottom of the auger sections. A separate feed hopper power head is used to drive the feed hopper. Smaller types of loading equipment are lowered into the excavation and are used to keep the feed hopper loaded. The feed hopper conveys excavation material to the main auger sections. The material is forced into the main auger sections which lift the excavation material vertically to a height that, preferably, is about twenty feet above grade level. A pivoting discharge chute is provided at the top of uppermost auger section. The discharge chute is preferably hinged and hydraulically raised or lowered. When a dump truck is properly positioned the discharge chute is lowered to a desired pitch angle to convey the excavation material into a dump box of the dump truck. The feed hopper power head and the main power head are energized to convey material upward through the main auger sections, down the discharge chute and into the dump truck. As soon as the truck is filled with the excavation material, the main power head and the feed hopper power head are de-energized to stop the flow of excavation material. The discharge chute is raised to a sufficiently elevated position which prevents inadvertent discharge of the excavation material from occurring. The now filled dump truck leaves the site as another dump truck moves forward to take its vacated position. The process for filling the dump truck is repeated. Additional hinged access doors are provided at spaced-apart intervals along a longitudinal length of each section and may be used for clean out of the auger if boulders, rebar or other unwanted materials enter the main auger sections. The distance between each auger flight is a variable. A preferred distance for most soil conditions will vary from twelve to eighteen inches between flights, although any desired spacing is possible. If the main auger is rotating at approximately twenty revolutions per minute with twelve inches between flights, a twelve cubic-yard dump truck can be filled in approximately four minutes. More torque is required to drive the main auger sections if a greater distance between flights is utilized. As the depth of the excavation increases, one end of the feed hopper may be raised as a lifting force is applied to the main auger sections sufficient to retain the main auger sections at the desired elevation. The excavation material is removed from under the feed hopper and from under the steel plates that support the female support member and the main auger sections. The feed hopper, steel plates, female support member and the main auger sections are lowered to the new depth with the steel ball again entering into the hemispherical recess of the female support member. The main auger sections are secured to the sidewall, as necessary. If preferred, the feed hopper can be disconnected from the lowermost main auger section before lowering and reattached after lowering is complete. If additional height of lift off the excavation material is required, another main auger section is added. The excavation process is repeated when sufficient additional excavation material has been removed and it is again necessary to lower the feed hopper and main auger sections to the next, lower excavation depth. The process is repeated until any desired excavation depth is attained. The discharge chute, feed hopper and main auger sections are removed one at a time and loaded onto flatbed trucks for easy removal and transport to the next job site, thereby providing a system and method for deep basement excavation.

DETAILED DESCRIPTION OF THE INVENTION

Figure 1:
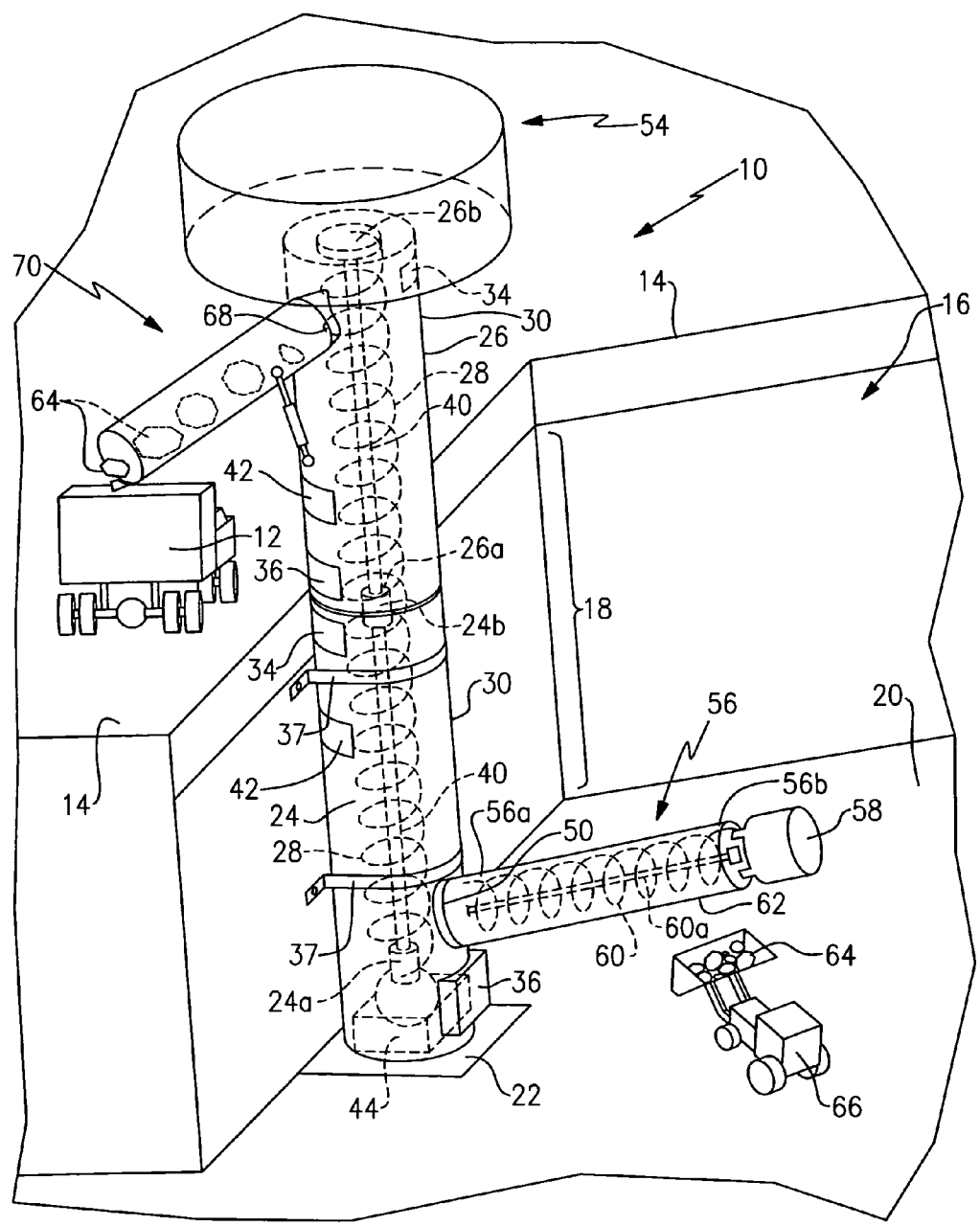
FIG. 1 is a view in perspective of a deep basement excavation utilizing a deep basement excavation system and truck loader.

Referring on occasion to all of the FIGURE drawings and now, in particular to FIG. 1, is shown a deep basement excavation system and truck loader, identified in general, by the reference numeral 10. A new method for excavating a deep basement is provided by use of the deep basement excavation system and truck loader 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

A dump truck 12 is disposed on a ground surface 14 or grade level. A deep basement excavation, identified in general by the reference numeral 16, is in progress. The excavation 16 includes a current depth, as shown by bracket 18 and a current excavation floor 20.

The deep basement excavation system and truck loader 10 includes a steel plate 22 that is disposed on the excavation floor 20. The steel plate 22 is used to distribute the weight of the deep basement excavation system and truck loader 10 over a greater surface area of the excavation floor 20. This is especially useful for soft or muddy soils.

The deep basement excavation system and truck loader 10 includes, at a minimum, a lower main auger assembly 24 and an upper main auger assembly 26. Depending on the depth 18 of the excavation 16, a plurality of intermediate main auger assemblies may be disposed between the lower main auger assembly 24 and the upper main auger assembly 26.

The main auger assemblies 24, 26 are preferably about twenty feet in length, although any length section 24, 26 is possible. Flexibility in the diameter of the main auger assemblies 24, 26 is also possible.

A preferred diameter for an auger blade 28 for use in each of the main auger assemblies 24, 26 is thirty inches. The auger blades 28 are each disposed in a casing 30 that includes a diameter of approximately 32 inches. Allowing for the thickness of the casing 30, the outer edge of each auger blade 28 is disposed in close proximity to an interior surface of the casing 30 to maximize efficiency of the deep basement excavation system and truck loader 10. Each of the main auger blades 28 include a spiral blade that extends the longitudinal length of each of the main auger assemblies 24, 26.

Figure 2:
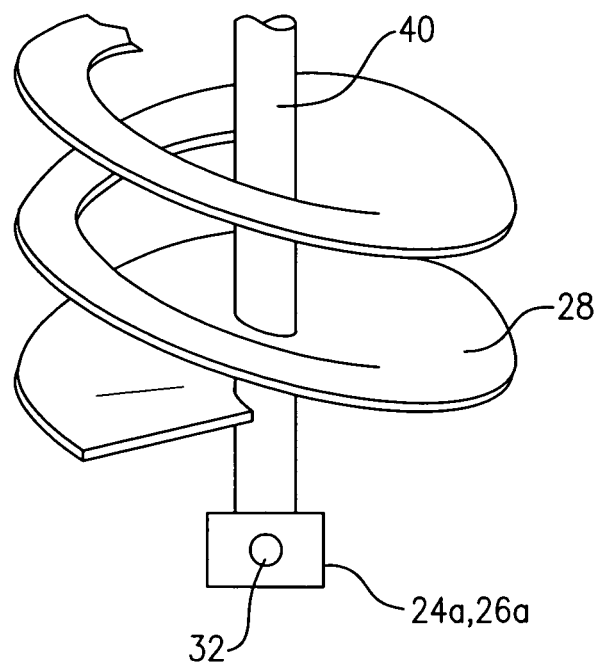
FIG. 2 is a side view of a male square drive for use with the system and method of FIG. 1.
Figure 3:
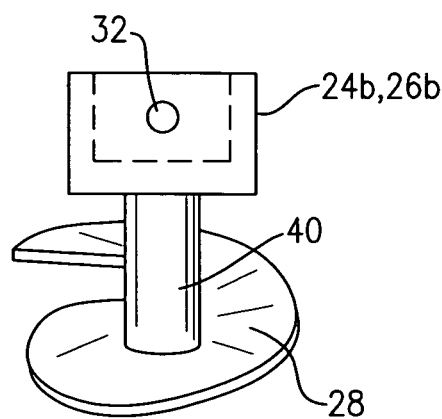
FIG. 3 is a side view of a female square drive for use with the male square drive of FIG. 2.

Each main auger assembly 24, 26 includes a male square-drive 24a, 26a at a lower end and a female square drive 24b, 26b at an opposite upper end. See also FIG. 2 and FIG. 3. The male square drive 24a, 26a and the female square drive 24b, 26b of each main auger assembly 24, 26 are attached to opposite ends of a drive rod 40 that extends the longitudinal length of each main auger assembly 24, 26. The auger blades 28 are attached to the drive rod 40, such as by welding, along their entire length for strength.

The male square drive 26a at the bottom of the upper main auger assembly 26 fits into the female square drive 24b of the lower main auger assembly 24. A hole 32 (See FIG. 4) through both the male square drive 26a and the female square drive 24b allows insertion of a pin there-through to secure the lower main auger assembly 24 and the upper main auger assembly 26 together. If desired, a hex drive instead of a square drive could be used. These examples illustrate means for operatively connecting adjacent auger blades 28 together.

The upper main auger assembly 26 is attached to the lower main auger assembly 24 by any preferred means that maintains a center longitudinal axis of the lower main auger assembly 24 in alignment with a center longitudinal axis of the upper main auger assembly 26. For example, flanges attached at opposite ends of each of the main auger assemblies 24, 26 could be bolted together. Alternately, brackets could be welded at opposite ends of each of the main auger assemblies 24, 26. When the upper main auger assembly 26 is placed on top of the lower main auger assembly 24, the brackets could be aligned with one another. Bolts could then be placed through holes provided in all of the brackets to secure the main auger assemblies 24, 26 together.

The main auger assemblies 24, 26 each include an upper hinged access door 34 and an opposite lower hinged access door 36 that allows passage through the casing 30 proximate each end. The hinged access doors 34, 36 allow access for fastening the main auger assemblies 24, 26 together.

Any amount or desired type of bracing 37 is used to secure the main auger assemblies 24, 26 to a reinforced sidewall of the excavation 16. Similarly, any desired type of above-grade bracing (not shown) at or above the ground surface 14 is also provided to secure the upper main auger assembly 26 in position. The bracing 37 and the above-grade bracing also prevents the main auger assemblies 24, 26 from rotating. As described hereinafter, considerable torque is experienced during use. Because it is well known that every action produces an equal and opposite reaction the deep basement excavation system and truck loader 10 must be adequately braced to ensure that the casing 30 or anything attached to the casing 30 does not rotate during use.

As desired, spaced apart intermediate access doors 42 are provided along the longitudinal length of the casing 30 between the upper hinged access door 34 and the lower hinged access door 36. The intermediate access doors 42 provide access to the auger blade 28 and are useful for removing unwanted objects that may enter the main auger assemblies 24, 26.

Figure 4:
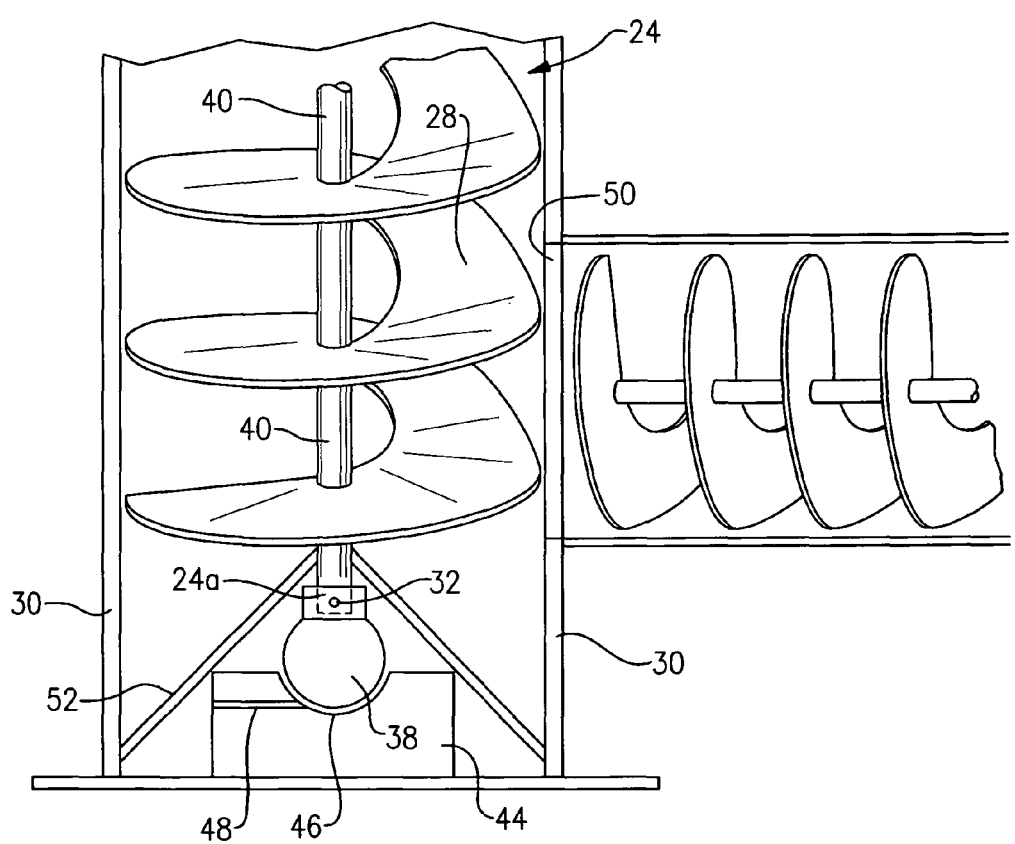
FIG. 4 is a side view of the bottom support structures that are used with the system and method of FIG. 1.

Now referring to FIG. 4, a large steel ball 38 includes a female square drive that is constructed like the female square drives 24b, 26b. The female square drive of the steel ball 38 is attached to the male square drive 24a of the lower main auger assembly 24. A pin secures the steel ball 38 to the male square drive 24a.

The male square drive 24a, 26a and the female square drive 24b, 26b of each auger assembly 24, 26 are attached to opposite ends of a drive rod 40 that extends the longitudinal length of each main auger assembly 24, 26.

As mentioned above, each auger blade 28 is comprised of a spiral blade that is attached to the drive rod 40 and which extends the longitudinal length of the main auger assembly 24, 26. Therefore, rotation of the drive rod 40 causes a corresponding rotation of the auger blade 28 to occur.

A female support member 44 that includes a hemispherical recess 46 is placed atop the steel plate(s) 22. The steel ball 38 is disposed in the hemispherical recess 46. A channel 48 is provided through the female support member 44 to supply grease, as needed, to the hemispherical recess 46 for lubrication of the steel ball 38, which rotates during use in the hemispherical recess 46.

The steel ball 38 in the hemispherical recess 46 functions as a thrust bearing that supports the bulk of the weight of the deep basement excavation system and truck loader 10.

A bottom feed hopper opening 50 is provided near the bottom of the lower main auger assembly 24.

A cone-shaped shield 52 is disposed at the bottom of the lower main auger assembly 24 over the male square drive 24a, the steel ball 38, and the female support member 44. The shield 52 prevents dirt, debris or excavation material from entering into the hemispherical recess 46.

A main power head, identified in general by the reference numeral 54, is attached to an upper end of the upper main auger assembly 26. Included inside the power head 54 is a powerful high-torque electric motor that is used to operate a hydraulic pump which supplies hydraulic fluid under pressure to a hydraulic motor. The main power head 54 is a type of equipment already in use by shoring contractors to drill large diameter holes into the earth.

The steel ball 38 and the hemispherical recess 46 of the female support member 44 provide means for supporting the weight of two (or more) auger assemblies 24, 26, the main power head 54 and any excavation material 64 that is disposed inside the casings 30 of the main auger assemblies 24, 26. If desired, the steel ball 38 and the female support member 44 could be replaced with a heavy duty bearing assembly as another means for supporting the weight.

The main power head 54 includes a male square drive output shaft 54a that is placed in the female square drive 26b of the upper main auger assembly 26. The main power head 54 is attached to the casing 30 of the upper main auger assembly 26 by flanges or brackets that are attached to the casing 30 and to the main power head 54 which are then bolted together. Therefore, the main power head 54 cannot rotate with respect to the casing 30, during use.

The main power head 54, when energized, is used to rotate the drive rod 40 and the auger blade 28 of the upper main auger assembly 26. The male square drive 26a of the upper main auger assembly 26 rotates the female square drive 24b of the lower main auger assembly 24 which, in turn, rotates the drive rod 40 and the auger blade 28 of the lower main auger assembly 24.

The main power head 54 illustrates means for rotating the drive rod 40 and the auger blades 28 sufficient to lift a quantity of excavation material 64 from a bottom of the lower main auger assembly 24 to a top of the upper main auger assembly 26. Although not preferred, a sufficiently powerful diesel engine with a properly designed transmission could also be used. The diesel engine would provide alternate means for rotating the drive rod 40 and the auger blades 28.

Referring back to FIG. 1, a feed hopper, identified in general by the reference numeral 56, includes a first end 56a and an opposite second end 56b. The first end 56a is fastened to the lower main auger assembly 24 over the feed hopper opening 50.

A feed hopper power head 58 is attached to a feed auger 60 at the second end 56b using bolts or brackets, in a manner similar to that as previously described for attachment of the main power head 54 to the casing 30. The feed hopper power head 58 is similar to the main power head 54, but is smaller and less powerful as less torque is required to move excavation material 64 horizontally in the feed hopper 56 than is required to move the excavation material 64 vertically in the main auger assemblies 24, 26.

The feed auger 60 includes a center drive shaft 60a that extends the longitudinal length of the feed hopper 56. A feed hopper casing 62 that is open along the top otherwise tightly surrounds a feed auger blade of the feed auger 60 at its bottom and along its sides.

Properly sized excavation machinery 66 (i.e., material loading equipment) is lowered by any preferred means to the excavation floor 20. The excavation machinery 66 are used to lift or scrape the excavation material 64 off of the excavation floor 20 and dump the excavation material 64 into the open top of the feed hopper 56. In this manner the excavation material 64 is used to keep the feed hopper 56 loaded.

When the feed hopper power head 58 is energized, the feed hopper 56 conveys the excavation material 64 to the bottom of the lower main auger assembly 24. The excavation material 64 is urged through the feed hopper opening 50 and into contact with a lower portion of the auger blade 28 of the lower main auger assembly 24.

The main power head 54 is running whenever the feed hopper power head 58 is energized to prevent a forced buildup of the excavation material 64 at the bottom of the lower main auger assembly 24. It is possible to energize the main power head 54 when the feed hopper power head 58 is de-energized. This would be used to clear out (i.e., remove) any remaining excavation material 64 inside either of the main auger assemblies 24, 26, for example when the excavation 16 has been completed or when it is necessary to lower the deep basement excavation system and truck loader 10 to increase the depth 18 of the excavation 16.

During normal use, the feed hopper power head 58 and the main power head 54 are energized. The spacing between each consecutive layer of the auger blade 28 is referred to as its "flight". The feed auger 60 also includes its own flight.

The flight of the auger blade 28 and the flight of the feed auger 60, along with the speed of rotation of the main power head 54 and also of the feed hopper power head 58, are selected to move as close to an identical amount of the excavation material 64 through the feed hopper 56 as through the main auger assemblies 24, 26. This helps to ensure the smooth flow of the excavation material 64 at a maximum rate out of the excavation 16 and into the dump truck 12 as rapidly as possible.

It is, of course, understood that the number and type of excavation machinery 66 disposed on the excavation floor 20 and operating simultaneously is selected to ensure that the feed hopper 56 and the main auger assemblies 24, 26 operate at or close to their maximum throughput in removing excavation material 64 out of the excavation 16 and conveying it above the surface 14.

Preferably, the upper main auger assembly 26 lifts the excavation material 64 to a height that is about twenty feet above the ground surface 14. A discharge opening 68 is provided through the upper main auger assembly 26 proximate its upper end.

A pivoting discharge chute, identified in general by the reference numeral 70, is provided at the top of uppermost auger assembly 26. An upper end of the discharge chute 70 is disposed over the discharge opening 68. An upper circular plate 72 is preferably included above the discharge opening 68 and is secured to the inside of the casing 30. A hole in the center of the circular plate 72 allows for passage of the male square drive output shaft 54a of the main power head 54 there-through. The circular plate 72 prevents further rising of the excavation material 64 which, in turn, forces the excavation material 64 out of the discharge opening 68 and into the upper portion of the chute 70. During normal filling of the dump truck 12, the chute 70 includes a sufficient angle to ensure that the excavation material 64 flows smoothly through the chute 70 and into the bed of the dump truck 12.

The discharge chute 70 is raised or lowered by use of a hydraulic cylinder 74. After the dump truck 12 has been sufficiently filled with the excavation material 64, the main power head 54 and the feed hopper power head 58 are de-energized. Whenever the feed hopper power head 58 is de-energized, workers that operate the excavation machinery 66 know to pause momentarily after the feed hopper 56 has been filled.

The chute 70 is then sufficiently raised to clear the bed of the dump truck 12 and to prevent any additional excavation material 64 from traversing down the chute 70. This provides a safe environment for loading the dump trucks 12, free of the hazard of unwanted falling excavation material 64. When the chute 70 is fully raised the discharge end of the chute 70 is disposed above the discharge opening 68.

The dump truck 12 then drives away to remove a load of the excavation material 64 away from the excavation 16 site. An empty dump truck 12 then takes its place and the chute 70 is again sufficiently lowered. The main power head 54 and the feed hopper power head 58 are again energized and the workers at the excavation floor 20 resume their filling of the feed hopper 56.

The distance between auger blade 28 flight, as previously mentioned, is a variable. A preferred distance for most soil conditions will vary from twelve to eighteen inches between flights, although any desired spacing is possible.

If the main auger assemblies 24, 26 are rotating at approximately twenty revolutions per minute with twelve inches between flights, a twelve cubic-yard dump truck 12 can be filled in approximately four minutes.

Eventually, the excavation floor 20 will be further lowered by the ongoing removal of the excavation material 64 by the deep basement excavation system and truck loader 10. If desired, the second end 56b of the feed hopper 56 may be raised by the excavation machinery 66 to allow removal of any remaining excavation material 64 thereunder. A lifting force is applied to the main auger assemblies 24, 26 sufficient to retain them at their current position and elevation.

The excavation material 64 is removed from under the steel plates 22 that support the female support member 44 and the main auger assemblies 24, 26. The steel plates 22, female support member 44 and the main auger assemblies 24, 26 are lowered to the new, now lower, excavation floor 20 ensuring that the steel ball 38 again enters into the hemispherical recess 46 of the female support member 44.

The main auger assemblies 24, 26 are secured to the sidewall, as necessary. If preferred, the feed hopper 56 can be disconnected from the lower main auger assembly 24 before lowering of the main auger assemblies 24, 26 occurs. After lowering, the feed hopper 56 would again be reattached to the lower main auger assembly 24.

When the excavation floor 20 has been lowered a sufficient amount additional height of lift of the excavation material 64 than can be provided by the upper and lower main auger assemblies 24, 26 is required. At this time another intermediate auger section is added between the two main auger assemblies 24, 26. The intermediate auger assembly (not shown) is substantially identical to either the upper or lower main auger assemblies 24, 26. If desired, all auger assemblies (i.e., main and intermediate) may include the feed hopper opening 50 and the discharge opening 68 that can be covered with appropriately sized cover plates, as desired. Similarly, the upper circular plate 72 can be removed from the upper main auger assembly 26 and attached to any other auger assembly (intermediate or lower 24). In this manner any one of the main auger assemblies 24, 26 can be readily converted and used as either the lower main auger assembly 24 or the upper main auger assembly 26 or as one of the intermediate auger assemblies.

Accordingly, as the excavation floor 20 is lowered and additional intermediate auger assemblies are required, it is possible to remove the main power head 54 and the circular plate 72 from the upper auger assembly 26. A cover plate would be secured to the casing 30 to cover the discharge opening 68 after the discharge chute 70 was disconnected. In this manner, the upper main auger assembly 26 is converted to an intermediate auger assembly. After lowering and securing of the lower main auger assembly 24 and the newly converted intermediate auger assembly 26 to the lowered excavation floor 20 a new auger assembly is attached to the top of the now converted intermediate auger assembly 26. The cover plate 72, the main power head 54, and the discharge chute 70 are attached to the new auger assembly, which functions as the new upper main auger assembly. Additional main auger assemblies are progressively attached to provide any desired depth 18 of the excavation 16.

When the excavation 16 is complete the component parts of the deep basement excavation system and truck loader 10 are disassembled, hoisted out of the excavation 16 by smaller equipment because of their relatively low weight, along with the excavation machinery 66. The component parts are then loaded onto a flatbed truck (not shown) for easy transportation away from the excavation 16 job site. The smaller size of the component parts allows for easier and lower cost of moving as there is no oversized equipment that must be transported.

Accordingly, the deep basement excavation system and truck loader 10 provides significant benefits and advantages over the prior-art equipment and methods for accomplishing deep basement excavations.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A deep basement excavation system and truck loader, comprising:
   (a) at least two main auger assemblies, wherein said at least two main auger assemblies include a lower main auger assembly and an upper main auger assembly;
   (b) means for securing said upper main auger assembly to said lower main auger assembly, wherein a center longitudinal axis of said lower main auger assembly aligns with a center longitudinal axis of said upper main auger assembly and wherein said center longitudinal axes are vertical;
   (c) an auger blade disposed in a casing of each of said main auger assemblies, wherein said casing includes a hollow cylindrical shape, and wherein said auger blade includes a drive rod and a spiral blade attached to said drive rod, and wherein said drive rod extends along a longitudinal length of each of said main auger assemblies;
   (d) means for operatively connecting a bottom of said auger blade of said upper main auger assembly to a top of said auger blade of said lower main auger assembly;
   (e) means for rotating said drive rod and said auger blade sufficient to lift a quantity of excavation material from a bottom of said lower main auger assembly to a top of said upper main auger assembly; and
   means for supporting the weight of said at least two main auger assemblies and said means for rotating said drive rod and said auger blade and any of said excavation material disposed along said longitudinal length of each of said main auger assemblies.

2. The deep basement excavation system and truck loader of claim 1 wherein said means for supporting the weight of said at least two main auger assemblies includes a steel ball attached to a bottom of said drive rod of said lower main auger assembly, and a female support member that includes a hemispherical recess in said female support member, wherein a lower half of said steel ball is disposed in said hemispherical recess during use.

3. The deep basement excavation system and truck loader of claim 2 including a channel for conveying a lubricant into said hemispherical recess.

4. The deep basement excavation system and truck loader of claim 2 including a plate disposed under said female support member, wherein said plate distributes the weight of said at least two main auger assemblies and any of said excavation material disposed along said longitudinal length of each of said main auger assemblies over a greater surface area of a bottom of an excavation than is provided by a bottom of said female support member.

5. The deep basement excavation system and truck loader of claim 2 wherein said means for supporting the weight of said at least two main auger assemblies and any of said excavation material includes a cone shield that is disposed over said steel ball and over said female support member.

6. The deep basement excavation system and truck loader of claim 1 wherein said means for rotating includes a main power head that is secured to an upper end of said casing of said upper main auger assembly, and wherein said main power head is operatively connected to said auger blade.

7. The deep basement excavation system and truck loader of claim 6 wherein said main power head includes an electric motor that is operatively connected to a hydraulic pump, and wherein said hydraulic pump supplies hydraulic fluid under pressure to a hydraulic motor, and wherein said hydraulic motor is operatively connected to said auger blade.

8. The deep basement excavation system and truck loader of claim 1 including a feed hopper that is disposed at a bottom of an excavation, and wherein one end of said feed hopper is attached to a feed hopper opening provided through said casing of said lower main auger assembly, and wherein said feed hopper includes a feed auger and a feed hopper casing that encloses a bottom and sides of said feed auger, and wherein a top of said feed hopper casing is open, and wherein said feed hopper includes means for rotating said feed auger, and wherein a quantity of said excavation material is placed in said top of said feed hopper casing and is conveyed through said feed hopper opening to said auger blade when said means for rotating said feed auger is energized.

9. The deep basement excavation system and truck loader of claim 8 wherein said means for rotating said feed auger includes a feed hopper power head that is attached to said feed hopper, and wherein said feed hopper power head includes an electric motor.

10. The deep basement excavation system and truck loader of claim 1 including a discharge chute that is attached to an upper end of said upper main auger assembly proximate to a discharge opening provided through said casing of said upper main auger assembly, wherein said excavation material that is lifted through said lower and said upper main auger assemblies is urged out of said discharge opening and into said discharge chute.

11. The deep basement excavation system and truck loader of claim 10 wherein said discharge chute is pivotally attached at a first end thereof to said casing of said upper main auger assembly, and wherein said discharge chute includes a lower position and an upper position and is movable between said lower and said upper position, and wherein when said discharge chute is disposed in said lower position a distal end of said discharge chute that is maximally disposed away from said casing is at a lower elevation than said first end, and wherein when said discharge chute is disposed in said lower position said excavation material flows down said discharge chute and out of said distal end, and wherein when said discharge chute is disposed in said upper position said distal end is at a higher elevation than said first end and said excavation material is prevented from flowing out of said distal end.

12. The deep basement excavation system and truck loader of claim 11 including a hydraulic cylinder, wherein said hydraulic cylinder is attached at one end thereof to said casing and wherein said hydraulic cylinder is attached at an opposite end thereof to said discharge chute, and wherein said hydraulic cylinder is used to move said discharge chute between said lower position and said upper position.

13. The deep basement excavation system and truck loader of claim 1 including an intermediate auger assembly, wherein said intermediate auger assembly is disposed between said lower main auger assembly and said upper main auger assembly, and wherein said intermediate auger assembly is secured to said lower main auger assembly at a lower end of said intermediate auger assembly, and wherein said intermediate auger assembly is secured to said upper main auger assembly at an upper end of said intermediate auger assembly.

14. The deep basement excavation system and truck loader of claim 1 including at least one access door attached to said casing of said upper main auger assembly or said lower main auger assembly or both said upper main auger assembly and said lower main auger assembly.

15. The deep basement excavation system and truck loader of claim 1 wherein said auger blade is approximately thirty inches in diameter, and wherein said auger blade includes a distance between consecutive flights of said auger blade that range from approximately ten inches apart to approximately thirty inches apart.

16. A method for excavating a deep basement that includes an excavated depth that is greater than thirty feet deep, comprised of the steps of:
   (a) providing at least two main auger assemblies that each include an auger blade that extends along a longitudinal length of each of said main auger assemblies;
   (b) securing said main auger assemblies together so that each of said main auger assemblies are vertical and that a casing of a lower main auger assembly is secured to a casing of an upper main auger assembly and disposing a bottom end of said lower main auger assembly at a bottom of an excavation that is at least thirty feet deep;
   (c) attaching each auger blade together so that if one auger blade is rotated all auger blades will rotate in unison;
   (d) providing a discharge chute that is operatively connected to a discharge opening that is provided at an upper end of an uppermost main auger assembly;
   (e) providing means for rotating said auger blades and using said means for rotating to rotate said auger blades;
   (f) urging a quantity of excavation material through a feed hopper opening that is provided through a bottom end of said casing of said lower main auger assembly and into contact with a bottom portion of said auger blade of said lower main auger assembly;
   (g) lifting said excavation material upward through said lower main auger assembly and upward through said upper main auger assembly; and
   (h) discharging said excavation material through said discharge opening and into said discharge chute.

17. The method of claim 16 including the additional step of providing support at said bottom of said excavation that is sufficient to support the weight of said at least two main auger assemblies and the weight of said excavation material and the weight of said means for rotating said auger blades.

\* \* \* \* \*